(12) United States Patent
Huang

(10) Patent No.: US 8,593,806 B2
(45) Date of Patent: Nov. 26, 2013

(54) HEAT DISSIPATION SYSTEM

(75) Inventor: Guo-He Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 246 days.

(21) Appl. No.: 13/151,350

(22) Filed: Jun. 2, 2011

(65) Prior Publication Data

US 2012/0140399 A1 Jun. 7, 2012

(30) Foreign Application Priority Data

Dec. 6, 2010 (CN) .......................... 2010 1 0574898

(51) Int. Cl.
*H05K 7/20* (2006.01)

(52) U.S. Cl.
USPC ............ 361/679.49; 361/679.46; 361/679.48; 361/679.51; 361/692; 361/695; 165/80.2; 165/122

(58) Field of Classification Search
None
See application file for complete search history.

(56) References Cited

U.S. PATENT DOCUMENTS

| | | | | |
|---|---|---|---|---|
| 6,462,948 B1* | 10/2002 | Leija et al. | ..................... | 361/697 |
| 7,403,388 B2* | 7/2008 | Chang | ........................... | 361/695 |
| 7,760,498 B2* | 7/2010 | Shan et al. | ..................... | 361/695 |
| 7,768,781 B2* | 8/2010 | Makley et al. | ................ | 361/695 |
| 7,990,706 B2* | 8/2011 | Miyahara et al. | ............. | 361/695 |
| 8,014,146 B2* | 9/2011 | Li et al. | ..................... | 361/679.51 |
| 8,081,444 B2* | 12/2011 | Xiao et al. | ............... | 361/679.49 |
| 8,363,401 B2* | 1/2013 | Lai | ................................ | 361/697 |
| 2012/0044634 A1* | 2/2012 | Huang et al. | .............. | 361/679.49 |

* cited by examiner

*Primary Examiner* — Boris Chervinsky
(74) *Attorney, Agent, or Firm* — Altis & Wispro Law Group, Inc.

(57) ABSTRACT

A heat dissipation system includes an enclosure, and a mainframe module enclosed in the enclosure. The mainframe module includes a baseboard with a motherboard and a mass storage device attached to the baseboard, a first cooling fan mounted on a top surface of the motherboard, and an air guiding panel attached on the baseboard surrounding the mass storage device. The air guiding panel guides cool air to the mass storage device along a first direction and out of the mainframe module by the first cooling fan in a second direction perpendicular to the first direction.

15 Claims, 2 Drawing Sheets

HEAT DISSIPATION SYSTEM

BACKGROUND

1. Technical Field

The disclosure generally relates to a heat dissipation system, and especially to a heat dissipation system for improving heat dissipation efficiency of a mass storage device in computer systems.

2. Description of Related Art

All-in-One computers are desktop computers that combine the monitor into the same case as the CPU. A typical all-in-one computer includes a motherboard. A plurality of heat sources (e.g., CPU, north bridge chip, south bridge chip) are attached on the motherboard and a plurality of mass storage devices (such as hard disc drivers, or optical disc drivers) are positioned in the case. Cold airflow enters the computer, passes through an air channel between the hard disc and the motherboard, and dissipates heat from the hard disc, the CUP and other heat sources. In addition, the heated airflow is then sucked out from the computer by a plurality of fans. A special fan for the hard disc driver or the optical disc driver is needed and the costs increases.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
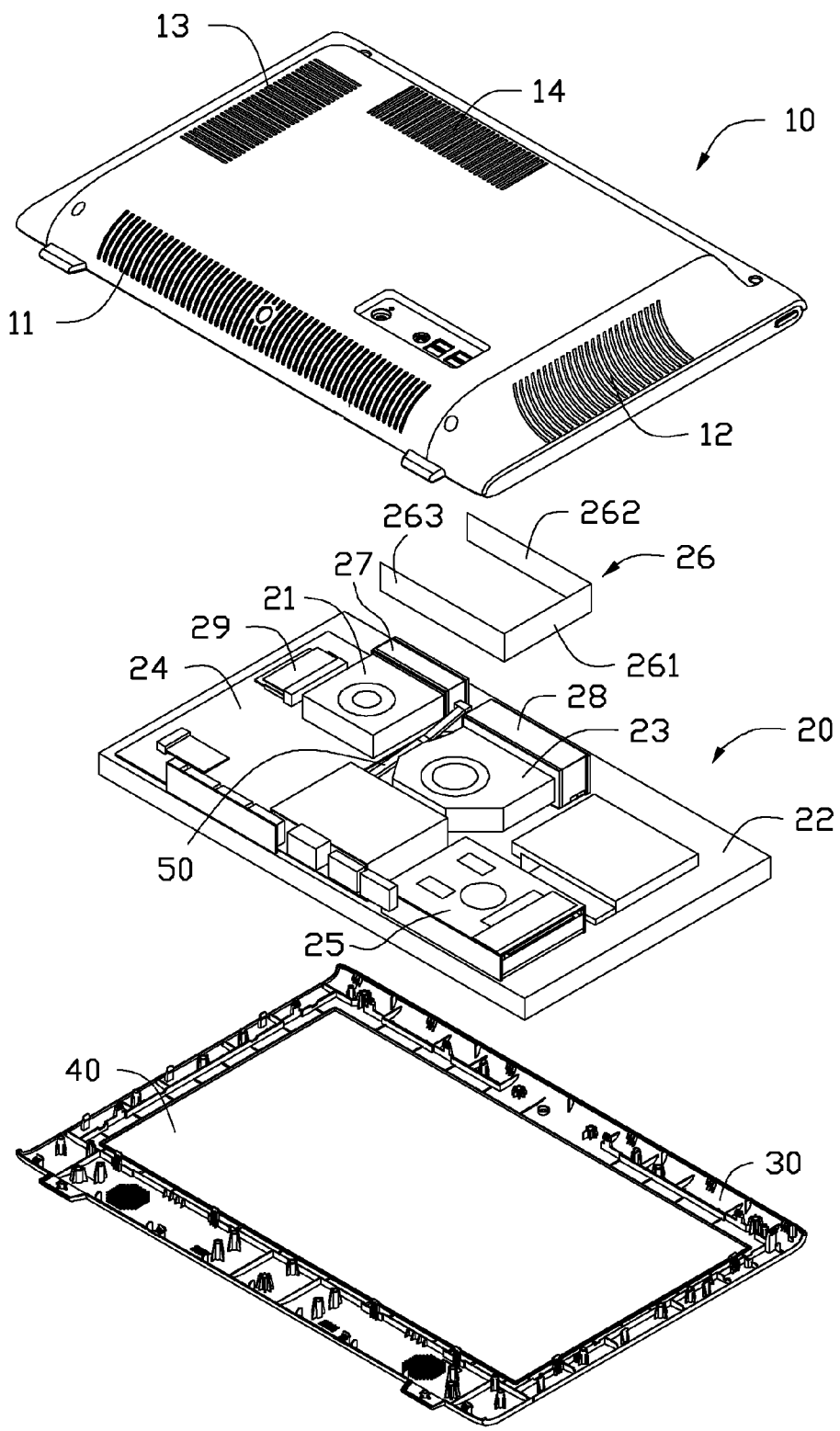
FIG. 1 is an exploded view of an embodiment of a heat dissipation system.
Figure 2:
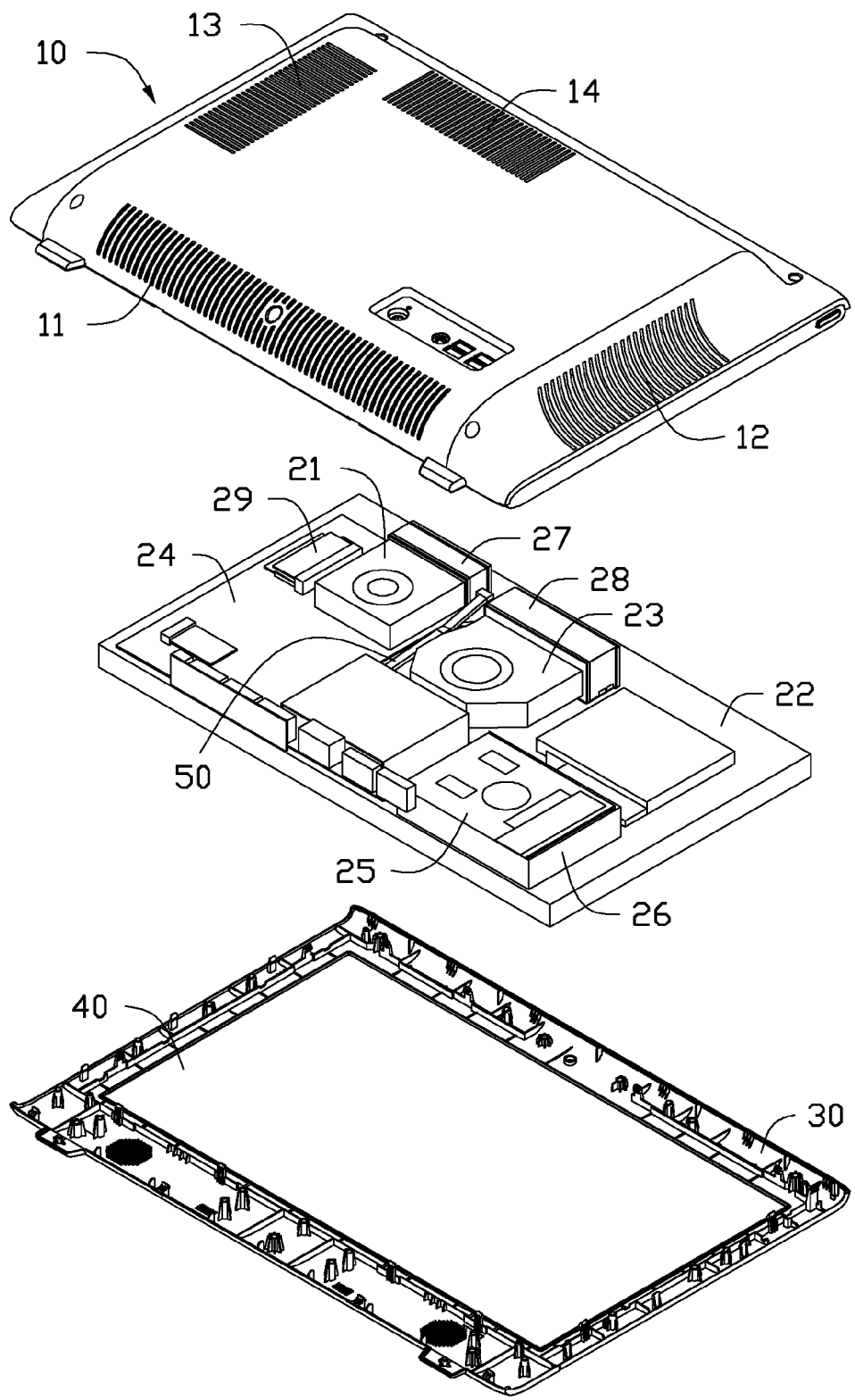
FIG. 2 is an assembled view of the heat dissipation system of FIG. 1.

Referring to FIGS. 1 and 2, an embodiment of a heat dissipation system includes a rear panel 10, a mainframe module 20, an enclosure frame 30, and a display module 40. The rear panel 10 and the enclosure frame 30 define an enclosure that can enclose the mainframe module 20 therein. The mainframe module 20 is positioned on a back of the display module 40.

The mainframe module 20 includes a baseboard 22, with a motherboard 24 attached on the baseboard 22. A first heat source (not shown) and a first cooling fan 21 positioned on the first heat source are mounted on a top surface of the motherboard 24. A second cooling fan 23 and a mass storage device 25 are mounted on the baseboard 22. An air guiding panel 26 is attached on the baseboard 22 surrounding the mass storage device 25. The air guiding panel 26 allows cool air to flow into the mass storage device 25 along a first direction. Cool air heated by the mass storage device 25 is blown out of the heat dissipation system by the first cooling fan 21 in a second direction perpendicular to the first direction. A second heat source (not shown) is mounted on a bottom surface of the motherboard 24. A third heat source 29 is mounted on the top surface of the motherboard 24 adjacent to the first cooling fan 21. The first cooling fan 21 is configured to dissipate heat for a first heat sink 27 positioned on the baseboard 22. The second cooling fan 23 is configured to dissipate heat for a second heat sink 28 positioned on the baseboard 22.

The air guiding panel 26 includes an air partition portion 261 and two air guiding portions 262, 263 perpendicularly extended from two sides of the air partition portion 261. Cool air from outside is able to flow into the air guiding panel 26 from a gap between the air partition portion 261 and the mass storage device 25 and flow through the mass storage device 25 along the air guiding portions 262, 263. In one embodiment, the first heat source is a CPU, the second heat source is a Graphics card, and the third heat source 29 is memory devices. The mass storage device 25 is a hard disc driver or an optical disc driver. A plurality of first air inlet holes 11 are defined on the rear panel 10 aligned with the first cooling fan 21 and the second cooling fan 23. A plurality of second air inlet holes 12 are defined on the rear panel 10 aligned with the mass storage device 25. A plurality of third air inlet holes 13 are defined on the rear panel 10 aligned with the third heat source 29. A plurality of air outlet holes 14 are defined on the rear panel 10 aligned with the first heat sink 27 and the second heat sink 28. A first air path (not labeled) is defined between the plurality of first air inlet holes 11 and the plurality of air outlet holes 14. The first air path is configure to direct the cool air toward the first heat sink 27 and the second heat sink 28 and out of the mainframe module 20 via the plurality of air outlet holes 14 by the first cooling fan 21 and the second cooling fan 23. A second air path (not labeled) is defined between the plurality of second air inlet holes 12 and the plurality of air outlet holes 14. The second air path is configure to direct the cool air toward the mass storage device 25 and out of the mainframe module 20 via the plurality of air outlet holes 14 by the first cooling fan 21 and the second cooling fan 23. A third air path (not labeled) is defined between the plurality of third air inlet holes 13 and the plurality of air outlet holes 14. The third air path is configure to direct the cool air toward the third heat source 29 and out of the mainframe module 20 via the plurality of air outlet holes 14 by the first cooling fan 21 and the second cooling fan 23. The first heat sink 27 is thermally connected to the second heat source via a plurality of heat pipes 50. The second heat sink 28 is thermally connected to the first heat source via the plurality of heat pipes 50.

In use, the first cooling fan 21 and the second cooling fan 23 rotate. The cool air from outside is sucked into the mainframe module 20 via the plurality of second air inlet holes 12 on the rear panel 10 and flows through the mass storage device 25 along the air guiding portions 262, 263. A speed of the cool air is accelerated when passing through the first cooling fan 21 and the second cooling fan 23. The cool air displaces the warm air heated by the mass storage device 25, the first heat sink 27, and the second heat sink 28. The warm air is blown out of the mainframe module 20 by the first cooling fan 21 and the second cooling fan 23 via the plurality of air outlet holes 14 on the rear panel 10. At the same time, the cool air from outside is sucked into the mainframe module 20 via the plurality of first air inlet holes 11 on the rear panel 10 and flows through the first heat sink 27 and the second heat sink 28. A speed of the cool air is accelerated when passing through the first cooling fan 21 and the second cooling fan 23. The cool air displaces the warm air heated by the first heat sink 27 and the second heat sink 28. The warm air is blown out of the mainframe module 20 by the first cooling fan 21 and the second cooling fan 23 via the plurality of air outlet holes 14 on the rear panel 10. At the same time, the cool air from outside is sucked into the mainframe module 20 via the plurality of third air inlet holes 13 on the rear panel 10 and flows through the third heat source 29. A speed of the cool air is accelerated when passing through the first cooling fan 21 and the second cooling fan 23. The cool air displaces the warm air heated by the first heat sink 27 and the second heat sink 28. The warm air is blown out of the mainframe module 20 by the first cooling fan 21 and the second cooling fan 23 via the plurality of air outlet holes 14 on the rear panel 10.

Using a software application called ICEPAK to simulate the efficiency of the heat dissipation system, the following results of an embodiment shown below were obtained. The simulated conditions are set to: initial ambient temperature 35 degrees Celsius. A power dissipation of the first heat source is 65 W. A power dissipation of the second heat source is 85 W. A power dissipation of the third heat source 29 is 22 W. A power dissipation of the mass storage device 25 is 25 W. The first heat sink 27 and the second heat sink 28 have a dimension of 85.3 millimeter (mm)×81 mm×87.7 mm (length×width× height). The first cooling fan 21 and the second cooling fan 23 have a dimension of 92 mm×92 mm×25 mm (length×width× height). A maximum air flow rate of the first cooling fan 21 and the second cooling fan 23 is 35.32 cubic feet per minute (cfm). A rated speed of the first cooling fan 21 and the second cooling fan 23 is 2000 revolutions per minute (rpm). The simulation according to the set conditions shows that the maximum temperature on the mass storage device 25 is 47.5047 degrees Celsius when the heat dissipation system of the disclosure, and 47.8345 degrees Celsius when using a common heat dissipation system. The fan for the mass storage device 25 in the typical heat dissipation apparatus is not needed and heat dissipation efficiency is improved.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat dissipation system comprising:
    an enclosure; and
    a mainframe module enclosed in the enclosure, the mainframe module comprising:
        a baseboard having a motherboard and a mass storage device attached thereto; wherein the mass storage device comprises four side surfaces;
        a first cooling fan mounted on a top surface of the motherboard; and
        an air guiding panel attached on the baseboard surrounding three side surfaces of the mass storage device; wherein the air guiding panel is configured to guide cool air to the mass storage device along a first direction and out of the mainframe module by the first cooling fan in a second direction perpendicular to the first direction.

2. The heat dissipation system of claim 1, wherein the air guiding panel comprises an air partition portion and two air guiding portions perpendicularly extended from two sides of the air partition portion; the cool air is able to flow into the air guiding panel from a gap between the air partition portion and the mass storage device; and the air guiding panel is configured to direct the cool air toward the mass storage device along the air guiding portions.

3. The heat dissipation system of claim 2, wherein a second cooling fan is mounted on the baseboard adjacent to the first cooling fan; the first cooling fan is configured to dissipate heat for a first heat sink which is mounted on the baseboard; and the second cooling fan is configured to dissipate heat for a second heat sink which is mounted on the baseboard.

4. The heat dissipation system of claim 3, further comprising a rear panel fixed on the mainframe module; wherein a plurality of first air inlet holes are defined on the rear panel aligned with the first cooling fan and the second cooling fan; a plurality of second air inlet holes are defined on the rear panel aligned with the mass storage device; and a plurality of air outlet holes are defined on the rear panel aligned with the first heat sink and the second heat sink.

5. The heat dissipation system of claim 4, wherein a heat source is mounted on the motherboard adjacent to the first cooling fan; and a plurality of third air inlet holes are defined on the rear panel aligned with the heat source.

6. The heat dissipation system of claim 4, wherein a first air path is defined between the plurality of first air inlet holes and the plurality of air outlet holes; the first air path is configured to direct the cool air toward the first heat sink and the second heat sink and out of the mainframe module via the plurality of air outlet holes by the first cooling fan and the second cooling fan.

7. The heat dissipation system of claim 5, wherein a second air path is defined between the plurality of second air inlet holes and the plurality of air outlet holes; the second air path is configured to direct the cool air toward the mass storage device and out of the mainframe module via the plurality of air outlet holes by the first cooling fan and the second cooling fan; a third air path is defined between the plurality of third air inlet holes and the plurality of air outlet holes; and the third air path is configured to direct the cool air toward the heat source and out of the mainframe module via the plurality of air outlet holes by the first cooling fan and the second cooling fan.

8. The heat dissipation system of claim 5, wherein the heat source is memory devices; and the mass storage device is a hard disc driver.

9. A heat dissipation system comprising:
    a baseboard having a motherboard and a mass storage device attached thereto;
    a first cooling fan mounted on a top surface of the motherboard; and
    an air guiding panel attached on the baseboard surrounding the mass storage device;
    wherein the air guiding panel is configured to guide cool air to the mass storage device along a first direction and out of the mainframe module by the first cooling fan in a second direction perpendicular to the first direction; wherein the air guiding panel comprises an air partition portion and two air guiding portions perpendicularly extended from two sides of the air partition portion; a flow passage is defined for cool air to flow into the air guiding panel from a gap between the air partition portion and the mass storage device; and the air guiding panel is configured to direct the cool air toward the mass storage device along the air guiding portions.

10. The heat dissipation system of claim 9, wherein a second cooling fan is mounted on the baseboard adjacent to the first cooling fan; the first cooling fan is configured to dissipate heat for a first heat sink which is mounted on the baseboard; and the second cooling fan is configured to dissipate heat for a second heat sink which is mounted on the baseboard.

11. The heat dissipation system of claim 10, further comprising a rear panel fixed on the mainframe module; wherein a plurality of first air inlet holes are defined on the rear panel aligned with the first cooling fan and the second cooling fan; a plurality of second air inlet holes are defined on the rear panel aligned with the mass storage device; and a plurality of air outlet holes are defined on the rear panel aligned with the first heat sink and the second heat sink.

12. The heat dissipation system of claim 11, wherein a heat source is mounted on the motherboard adjacent to the first cooling fan; and a plurality of third air inlet holes are defined on the rear panel aligned with the heat source.

13. The heat dissipation system of claim 11, wherein a first air path is defined between the plurality of first air inlet holes and the plurality of air outlet holes; the first air path is configured to direct the cool air toward the first heat sink and the second heat sink and out of the mainframe module via the plurality of air outlet holes by the first cooling fan and the second cooling fan.

14. The heat dissipation system of claim 12, wherein a second air path is defined between the plurality of second air inlet holes and the plurality of air outlet holes; the second air path is configured to direct the cool air toward the mass storage device and out of the mainframe module via the plurality of air outlet holes by the first cooling fan and the second cooling fan; a third air path is defined between the plurality of third air inlet holes and the plurality of air outlet holes; and the third air path is configured to direct the cool air toward the heat source and out of the mainframe module via the plurality of air outlet holes by the first cooling fan and the second cooling fan.

15. The heat dissipation system of claim 12, wherein the heat source is memory devices; and the mass storage device is a hard disc driver.

\* \* \* \* \*